May 26, 1931.   A. PONCEL   1,807,343
RADIO RECEIVING APPARATUS
Filed May 14, 1930
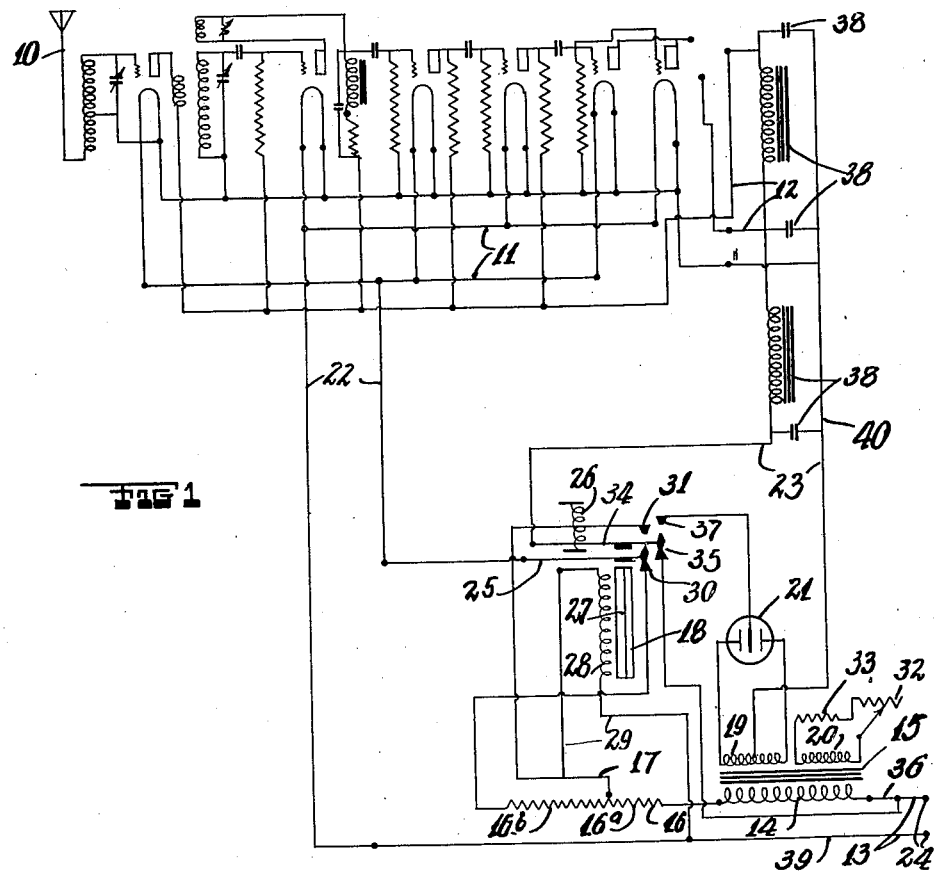
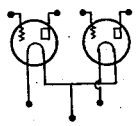
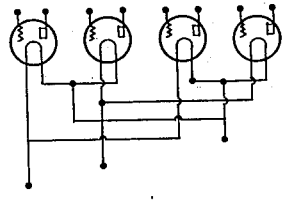
INVENTOR
Alexis Poncel
BY
ATTORNEY

315. ELECTRIC LAMP & DISCHARGE DEVICES, SYSTEMS.

Patented May 26, 1931

1,807,343

UNITED STATES PATENT OFFICE

ALEXIS PONCEL, OF LONG ISLAND, NEW YORK, ASSIGNOR OF FORTY-NINE PER CENT TO PAUL DESFOSSE, OF NEW YORK, N. Y.

RADIO RECEIVING APPARATUS

Application filed May 14, 1930. Serial No. 452,186.

This invention relates to new and useful improvements in a radio receiving apparatus, and has more particular reference to such an apparatus arranged to operate universally from a direct as well as an alternating current power supply from the customary house lighting circuits.

The invention has for an object the provision of a device of the class mentioned which is of simple durable construction, dependable in use and efficient in action, and which can be manufactured and sold at a reasonable cost.

The invention proposes a radio receiving system including a filament circuit and a plate circuit, a power circuit for connection with a source of direct or alternating current and connected with said filament and plate circuits and including the primary of a transformer connected in series with a resistance divided into sections by a tap and an electrically operated switch controlled by the passage of direct current in said power circuit for connecting the entire resistance in said filament circuit and by the passage of alternating current for connecting said tap for connecting part of said resistance in said filament circuit, said transformer having a secondary of two windings, means for changing the resistance of one of said windings for changing the inductance of said primary, said power circuit also including a rectifier, and said electrically operated switch being also controlled by the passage of direct current in said power circuit for disconnecting said rectifier and by the passage of alternating current for connecting the plate circuit with said rectifier.

The invention also proposes to connect the filaments or the heaters of the vacuum tubes of the radio receiving system in a combination series-multiple for a low consumption of filament current, then to bring the current to the filaments or heaters through said primary of the plate current transformer so that the primary of the transformer is at all times part of the filament circuit and in series with the filaments no matter if the power at the input is derived from an alternating or direct source of current.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a schematic wiring diagram of a radio receiving apparatus constructed according to this invention.

Fig. 2 is a schematic wiring diagram of a pair of tubes connected as proposed in this invention.

Fig. 3 is a schematic wiring diagram of four tubes connected as proposed in this invention.

The radio receiving apparatus in Fig. 1 is shown to consist of a radio receiving system 10 including a filament circuit 11 and a plate circuit 12, a power circuit 13 for connection with a source of direct or alternating current and connected with said filament circuit 11 and plate circuit 12 and including a primary 14 of a transformer 15 connected in series with a resistance 16 divided into sections 16$^a$ and 16$^b$ by a tap 17 and an electrically operated switch 18 controlled by the passage of direct current in said power circuit 13 for connecting the entire resistance 16 in said filament circuit and by passage of alternating current for connecting said tap 17 so as to connect part of said resistance 16 in said filament circuit 11, said transformer 15 having a secondary of two windings 19 and 20, means for changing the resistance of the winding 20 for changing the inductance of said primary 14, said power circuit 13 also including a rectifier 21, and said electrically operated switch 18 being also controlled by the passage of direct current in said power circuit 13 for disconnecting said rectifier 21 and by the passage of alternating current for connecting the plate circuit 12 with said rectifier 21.

The radio receiving system may be of any design and construction, and as illustrated on the drawing may easily be recognized by persons skilled in the art. The particular set shown is that of one stage radio amplification, detector, and four stages of audioamplifications. In all, six tubes have been shown. The filaments of these tubes are connected in a combination series-multiple as may be seen from a close inspection.

For defining the combination series-multiple connection above referred to, Figs. 2 and 3 have been illustrated. In Fig. 2 a pair of vacuum tubes are shown with their filaments connected in series with each other. In Fig. 3 one pair of vacuum tubes are shown connected with their filaments in series with each other and a second pair of tubes have been shown with their filaments connected in series with each other, and these two groups are connected in multiples with each other forming the combination series-multiple referred to. In Fig. 1 there are three groups of tubes connected in the combination series-multiple just referred to.

Leads 22 connect filament circuit 11 and the power circuit 13. Leads 23 connect the plate circuit with the power circuit. The minus lead of the plate current, as is usual in an average commercial B transformer, is connected with the winding 19 of the transformer 15. The points 24 represent the terminals of the power circuit which receive the input from an alternating or a direct current supply.

The electrically operated switch 18 is provided with a movable pole 25 normally urged in one direction by a spring 26 and drawable in the other direction by an electromagnet 27. The electromagnet has a controlling coil 28 connected in shunt by leads 29 in the power circuit 13. A stationary contact 30 is connected with the remote end of the resistance 16 and is engageable by the pole 25 when drawn by the electromagnet 27, and a second stationary contact 31 is connected with the tap 17 and is engageable by the pole 25 when drawn by the spring 26.

The means for changing the resistance of the winding 20 for changing the inductance of the primary 14 consists of a variable resistance 32 connected in series with a fixed resistance 33 connected across the ends of the winding 20. It is intended that a knob control the resistance 32 from the panel of the set. A change in the resistance of the circuit including the winding 20, by inductance will change the passage of current in the power circuit 13. The rectifier 21 is connected across the ends of the winding 19 constituting one of the secondary windings of the transformer 15.

The switch 18 is also provided with a second pole 34 normally drawn in one direction by the said spring 26 and drawable in the other direction by the electromagnet 27. The pole 34 acts between a stationary contact 35 connected to a lead 36 of the power circuit, and a second stationary contact 37 connected with the rectifier 21. The arrangement is such that when a direct current passes through the winding 28 the magnet 27 will draw the poles 25 and 34 so as to connect with the contacts 30 and 35.

When the receiver is plugged in an alternating source of current at the points 24, the radio receiver may be adjusted for volume regardless of the fluctuations of the voltage at the power house. The fixed resistance 33 is used against danger of short circuiting of the section of the winding 20 by the variable resistance 32. Upon turning of the control knob so as to change the resistance 32 the supply to the filament circuit will be controlled for said volume adjustment. A filter 38, constituting the usual filter comprising chokes and condensers for the smoothing of the plate current as usual in the average radio receiver using the rectified alternating current for plate supplies, is of usual construction but is so used that it filters the plate current no matter if the input is plugged in an alternating or a direct current source. When using an alternating current at the input points 24 the switch 18 will connect the input of the filter 38 to the rectifier 21. When a direct current source is in use at the input 24 of the radio receiver the filter 38 will be disconnected from the output of the rectifier 21 and the filter will then be connected directly with the input 24 on the positive side of the filament circuit at the lead 36. The other lead 39 for concluding the circuit with the lead 36 will then be the negative side and subsequently the return of the filament and plate circuit. The condensers of the filter 38 are connected to the filament circuit 11 by the B minus wire 40, which wire will return minus lead 39 of the input 24, the fluctuating component being present in the supplies of the plate current.

The changes of connecting the input controlled by pole 34 of the filter 38 to either positive side of the input 24 or to the output of the rectifier 21 is brought about by the electromagnetic switch 18. This switch is shown of the double pole, double throw type, and is used to connect the filter 38 to the rectifier 21 and the filament circuit 11 of the tubes of the receiving set to the tap 17 of the resistance 16 when the receiver is plugged in an alternating source of current at the input 24, and the filter to the positive lead 36. The filaments or heaters of the tubes of the radio receiving set are then connected by the pole 25 engaging the contact 30 to the resistance 16 when the input of the radio receiver is plugged in a direct source. The inductance of the winding 28 of the electromagnet of the switch 18 is arranged to be too high so the electromagnet 18 is capable of pulling the poles 25, 34 only when a direct current is flowing through the winding 28, that is, when the radio receiver is plugged in a direct current rent source at the input points 24. When the radio receiver is plugged in an alternating current source at the input 24 the contact between the points 31 and 37 and the poles 25 and 34 is made by the tension of the spring 26.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new, and desire to secure by United States Letters Patent is:—

1. A radio receiving apparatus arranged to operate universally from a direct as well as an alternating current power supply, comprising a radio receiving system including a filament circuit and a plate circuit, a power circuit in series with a source of direct or alternating current and connected in series with said filament and plate circuits and including the primary of a transformer connected in series with a resistance divided into sections by a tap and an electrically operated switch controlled by the passage of direct current in said power circuit for connecting the entire resistance in said filament circuit and by the passage of alternating current for connecting said tap for connecting part of said resistance in said filament circuit, said transformer having a secondary of two windings, means for changing the resistance of one of said windings for changing the inductance of said primary, said power circuit also including a rectifier, and said electrically operated switch being also controlled by the passage of direct current in said power circuit for disconnecting said rectifier and by the passage of alternating current for connecting the plate circuit with said rectifier.

2. A radio receiving apparatus arranged to operate universally from a direct as well as an alternating current power supply, comprising a radio receiving system including a filament circuit and a plate circuit, a power circuit in series with a source of direct or alternating current and connected in series with said filament and plate circuits and including the primary of a transformer connected in series with a resistance divided into sections by a tap and an electrically operated switch controlled by the passage of direct current in said power circuit for connecting the entire resistance in said filament circuit and by the passage of alternating current for connecting said tap for connecting part of said resistance in said filament circuit, said transformer having a secondary of two windings, means for changing the resistance of one of said windings for changing the inductance of said primary, said power circuit also including a rectifier, and said electrically operated switch being also controlled by the passage of direct current in said power circuit for disconnecting said rectifier and by the passage of alternating current for connecting the plate circuit with said rectifier, the filaments of the tubes included in said radio receiving system being connected in a combination series-multiple substantially as described.

3. A radio receiving apparatus arranged to operate universally from a direct as well as an alternating current power supply, comprising a radio receiving system including a filament circuit and a plate circuit, a power circuit in series with a source of direct or alternating current and connected in series with said filament and plate circuits and including the primary of a transformer connected in series with a resistance divided into sections by a tap and an electrically operated switch controlled by the passage of direct current in said power circuit for connecting the entire resistance in said filament circuit and by the passage of alternating current for connecting said tap for connecting part of said resistance in said filament circuit, said transformer having a secondary of two windings, means for changing the resistance of one of said windings for changing the inductance of said primary, comprising an adjustable resistance in series with said winding, said power circuit also including a rectifier, and said electrically operated switch being also controlled by the passage of direct current in said power circuit for disconnecting said rectifier and by the passage of alternating current for connecting the plate circuit with said rectifier.

4. A radio receiving apparatus arranged to operate universally from a direct as well as an alternating current power supply, comprising a radio receiving system including a filament circuit and a plate circuit, a power circuit in series with a source of direct or alternating current and connected in series with said filament and plate circuits and including the primary of a transformer connected in series with a resistance divided into sections by a tap and an electrically operated switch controlled by the passage of direct current in said power circuit for connecting the entire resistance in said filament circuit and by the passage of alternating current for connecting said tap for connecting part of said resistance in said filament circuit, said transformer having a secondary of two windings, and means for changing the resistance of one of said windings for changing the inductance of said primary.

5. A radio receiving apparatus arranged to operate universally from a direct as well as an alternating current power supply, comprising a radio receiving system including a filament circuit and a plate circuit, a power circuit in series with a source of direct or alternating current and connected in series with said filament and plate circuits and including the primary of a transformer connected in series with a resistance divided into sections by a tap and an electrically operated switch controlled by the passage of direct current in said power circuit for connecting the entire resistance in said filament circuit and by the passage of alternating current for connecting said tap for connecting part of said resistance in said filament circuit, said transformer having a secondary of two windings, means for changing the resistance of one of said windings for changing the inductance of said primary, said power circuit also including a rectifier, connected with a filter of said plate circuit, and said electrically operated switch being also controlled by the passage of direct current in said power circuit for disconnecting said rectifier and by the passage of alternating current for connecting the plate circuit with said rectifier.

6. A radio receiving apparatus arranged to operate universally from a direct as well as an alternating current power supply, comprising a radio receiving system including a filament circuit and a plate circuit, a power circuit in series with a source of direct or alternating current and connected in series with said filament and plate circuits and including the primary of a transformer connected in series with a resistance divided into sections by a tap and an electrically operated switch controlled by the passage of direct current in said power circuit for connecting the entire resistance in said filament circuit and by the passage of alternating current for connecting said tap for connecting part of said resistance in said filament circuit, said transformer having a secondary of two windings, means for changing the resistance of one of said windings for changing the inductance of said primary, said power circuit also including a rectifier, connected with the filter of said plate circuit, and said electrically operated switch being also controlled by the passage of direct current in said power circuit for disconnecting said rectifier without cutting out said filter and by the passage of alternating current for connecting the plate circuit with said rectifier.

In testimony whereof I have affixed my signature.

ALEXIS PONCEL.